United States Patent [19]

Numao et al.

[11] 3,795,175

[45] Mar. 5, 1974

[54] AUTOMATIC DEBURRING PROCESS

[75] Inventors: Saichi Numao; Yukio Yoneyama, both of Tochigi, Japan

[73] Assignee: Yorozu Jidosha Kogyo Kabushiki Kaisha, Kanagawa-ken, Japan

[22] Filed: June 1, 1972

[21] Appl. No.: 258,581

[30] Foreign Application Priority Data
Feb. 8, 1972  Japan.................................. 47-13753

[52] U.S. Cl....................... 90/24 A, 83/914, 90/38, 90/53, 425/806
[51] Int. Cl............................ B23d 1/08, B23d 1/24
[58] Field of Search.... 90/24 A, 38, 53, 26; 83/914; 425/806; 225/97, 103

[56] References Cited
UNITED STATES PATENTS
3,399,585  9/1968  Ahlert................................ 90/24 A
3,081,673  3/1963  Ansel................................ 90/38 X FOREIGN PATENTS OR APPLICATIONS
674,805  7/1952  Great Britain......................... 90/53

Primary Examiner—Francis S. Husar

[57] ABSTRACT

An automatic deburring process for the burrs produced within the bore of the cylinder block of an automotive engine, and an apparatus therefor, which consists in that a cutting edge shaped to register with the sectional shape of crank case section of the cylinder block is moved in the axial direction of said section, that is, in the direction of the crank shaft housed in said section, for cutting burrs on the internal wall surface of said section off from its base.

9 Claims, 18 Drawing Figures

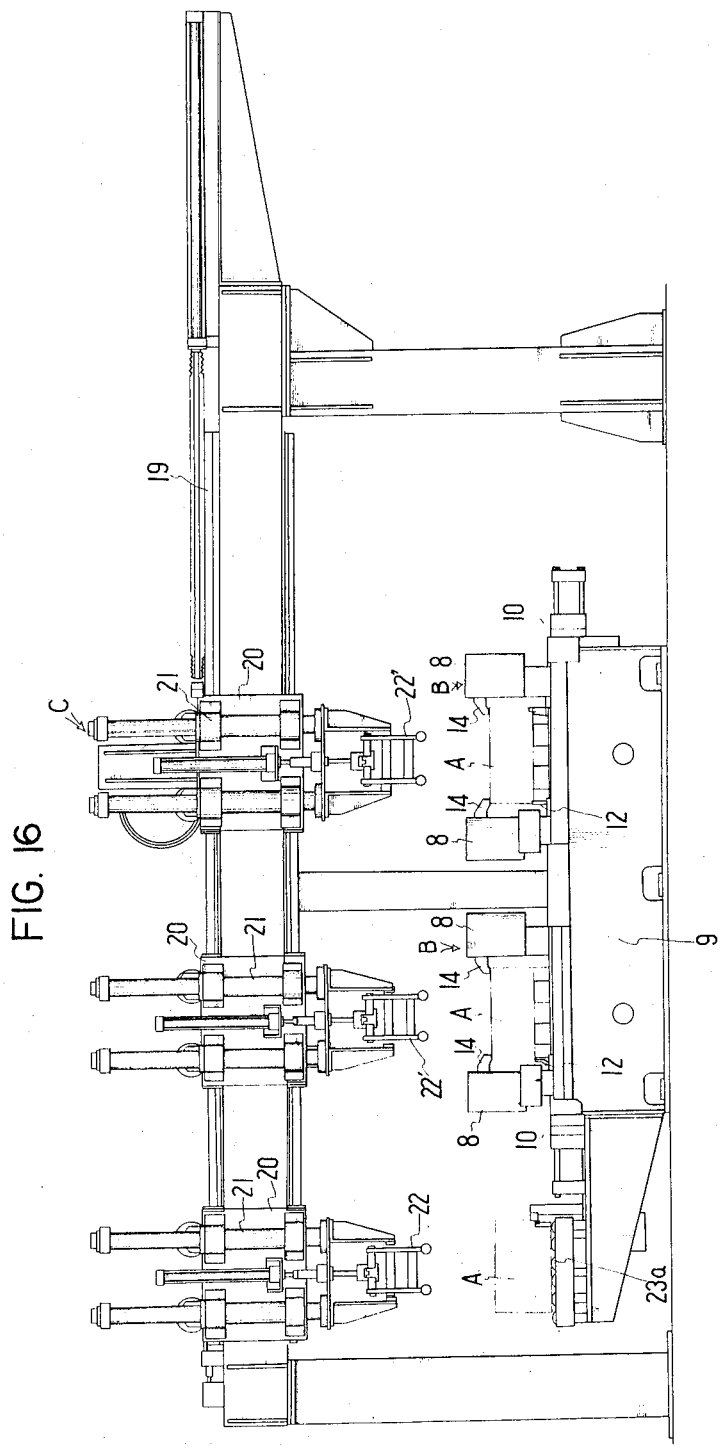

AUTOMATIC DEBURRING PROCESS

This invention relates to a deburring unit adapted for removal of the burrs produced on the periphery of a cylinder block of an automotive engine when cast in a mould and, more particularly, to an automatic deburring process for removal of burrs produced on the inner peripheral surface of the cylinder block which was hitherto considered unfeasible by an automatic process. This invention is also directed to the unit for putting the process into practice.

In the drawing:

FIG. 5 is a brief explanatory view of the present invention deburring unit;

FIG. 16 is a side view of the present invention unit which is designed so as to be operable automatically;

Figure 1:
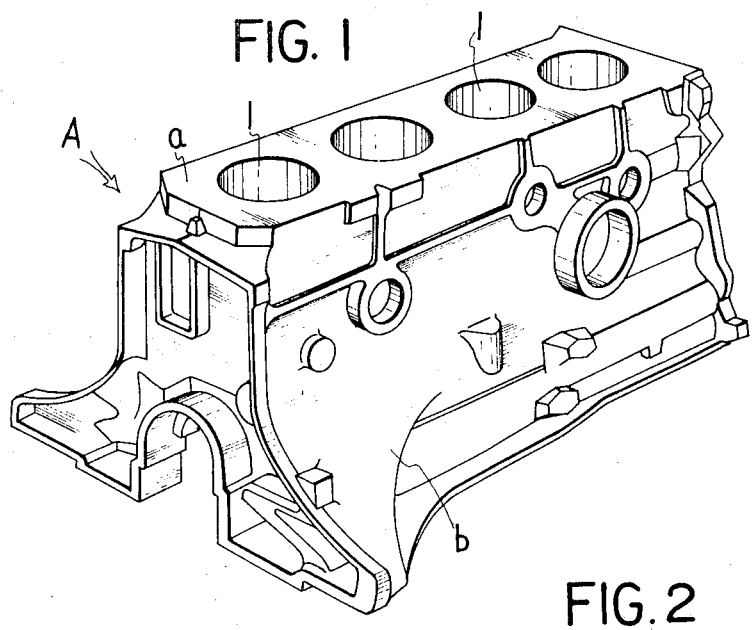
FIG. 1 is a perspective view of an engine cylinder block.
Figure 2:
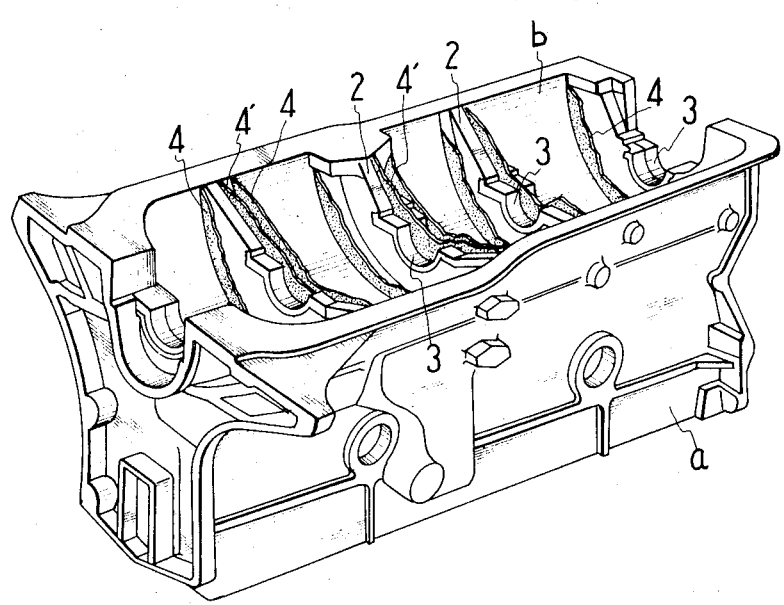
FIG. 2 is a perspective view similar to FIG. 1, in which the block is turned upside-down.

Referring now to the drawings, the engine cylinder block A cast in a mould has the shape usually as shown in FIG. 1. It has a rectangular cylinder section $a$ with a circular opening 1 for housing a piston, and a crank case section $b$ extending in a skirt fashion from the bottom of the cylinder section $a$ for housing a connecting rod and a crank shaft. Said cylinder section $a$ and crank case section $b$ are moulded as a single unit. The burrs produced on the periphery at the time of casting are removed by means of a deburring system including an automatic grinder adapted for performing a reciprocating motion relative to the peripheral surface of the cylinder section $a$.

However, the burrs are produced not only on the peripheral portion of the cylinder block but on the inner wall of the crank case section $b$ on both sides of the partition wall 2 dividing the crank case bore, and on the top of the partition wall 2 on the center of the metal retainer 3 for supporting crank shaft metal. These burrs 4, 4' are in a semicircular shape and are usually removed by manual operation using hammers, chisels and other tools.

This is chiefly because the inner wall surface of the cylinder block has a complicated configuration and this renders it impossible to use the above-mentioned deburring device including automatic grinders for the deburring operation. In the automotive industry in which the automation system is adopted extensively, the automatic deburring was so far considered to be unfeasible.

Therefore, the object of this invention is to provide a process and an apparatus for automatic removal of burrs from the inner wall surface of the cylinder block which was so far considered an operation which could not be automated.

In the conventional deburring procedure, the burrs produced as a continuous thin-walled flange along the junction line of the mould halves are removed gradually by machining from the one end of the flange. On the other hand, according to the present process, a cutting edge having a shape conforming to the contour line connecting to the inner wall of the crank case section $b$ is positioned inside the bore of the crank case section $b$ of the cylinder block A and reciprocated axially of the crank shaft disposed in the crank case section $b$. In this way, the inner end portions of the semicircular burrs 4 are shorn at a time and the burrs 4 are severed from the inner wall surface of the crank case section $b$.

Figure 3:
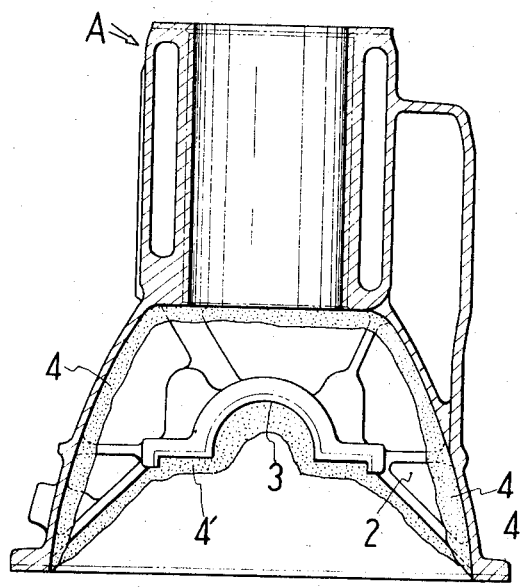
FIG. 3 is a vertical sectional view of the cylinder.
Figure 4:
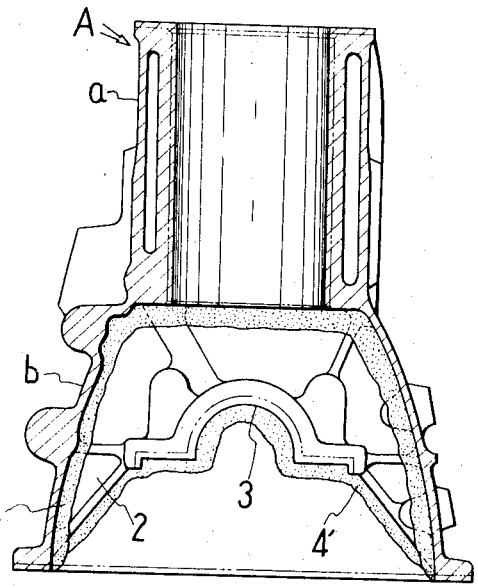
FIG. 4 is a sectional view similar to FIG. 3 but taken along a different vertical plane.

FIGS. 3 to 5 show the basic operation performed by the present invention. Burrs 4 produced on the bore of the crank case section $b$ are shown in FIGS. 3 and 4. The cutting edges for shearing off the burrs 4 are denoted at 5 in FIG. 5. Said cutting edge 5 is formed integrally with the peripheral part of a blade 7 inserted on the base 6 and has a shape substantially in registry with the contour line of the inner edge connecting to the inner wall of the crank case section $b$. In other words, said cutting edge has a shape roughly coincident with the sectional configuration of the inner wall surface of the crank case section $b$ on which the burrs 4 are produced. Although only one cutting edge 5 for shearing the burrs 4 is shown in FIG. 5, it is to be understood that other cutting edges 5 adapted for removal of burrs produced on other portions are formed with a shape corresponding to the sectional configuration of such portions on the crank case section $b$ on which the burrs are produced.

The machine bed 6 is so designed and constructed that the cutting edge 5 mounted on the blade 7 is movable back and forth axially of the crank case section $b$. A mechanism for reciprocating the cutting edge is annexed to the machine bed 6, although such mechanism is not shown in the drawing. The cylinder block A with burrs 4 formed thereto is carried by any suitable retainer means 8 and is positioned as shown in FIG. 5 with its crank case section $b$ overlying said blade 7 and moreover fixed in such position.

With the cylinder block A and the cutting edge 5 arranged in position as shown in FIG. 5, the machine base 6 is moved in a direction shown by the arrow mark X in the drawing and the edge 5 moved relative to the cylinder block A. The burrs 4 are then shorn off in their entirety from their roots. The cutting edge 5 is then returned to its original position and the cylinder block A is replaced by a new block A. The burr 4 can thus be removed by the same procedure as described above. Only one stroke of reciprocation of the cutting edge 4 is sufficient for removal of the burr 4 as with other shearing systems.

At this time, a relative movement between the cutting edge 5 and the cylinder block A is sufficient and the machine base 6 may be fixed and the cylinder block A movable.

In short, the inventive deburring process consists in that a cutting edge 5 shaped to register with the sectional shape of the crank case section *b* of the cylinder block A is moved in the axial direction of the said section *b*, that is, in the direction of the crank shaft housed in said section *b*, for cutting the burr 4 on the internal wall surface of the said section *b* off from its base. This process is based on such conception that, since the burr 4 on the internal wall surface of the cylinder block A is formed along a surface perpendicular to the axial direction of the crank case section *b*, such burr can be shorn by moving a cutting edge 5 shaped to register with the sectional shape of the crank case *b* in the axial direction of the crank case section *b* in its interior space. However, the sectional shape of the crank case section *b* of the cylinder block A taken in a direction perpendicular to said axial direction is not identical in shape in said axial direction but constantly changing so that there is not any portion with the same shape. It is therefore difficult in effect to move the cutting edge 5 of the above-mentioned shape in an axial direction in the inside of the bore of the said section *b*.

The inventive deburring process has been devised on the basis of the finding that the sectional shape of the crank case section *b* is changing in the axial direction but the sectional shape of the said section *b* is always constant as far as the narrow zone in the neighborhood of the burr 4 is concerned, and the burr 4 can be removed readily by having the cutting edge 5 shaped so as to be movable through said limited narrow zone.

Thus, the cutting edges 5 used in the present process are not used in common for removal of the burrs 4 formed on the portions of the bore of the crank case section *b* with different diameters, but are shaped to coincide with the different sectional configurations of the various parts of the crank case bore.

It may be feared that, when the cutting edge 5 shaped in this way is supported on the blade 7 in the above-mentioned manner and arranged within the bore of the said section *b* so as to be moved relative thereto for shearing the burr 4, said blade 7 may interfere with the ribs on the partition wall 2 provided in the crank case bore for supporting the metal retainers 3, or with the metal retainers 3 themselves, as the blade 7 is moved towards the burr 4 in FIG. 5 for shearing. The cutting edge 5 may also interfere with the internal wall surface of the crank case section *b* when moved in the opposite direction.

Another feature of the present invention is that the blade 7 supporting the cutting edge 5 has openings or cut-outs and has a sufficient thickness to support the cutting edge and that the blade 7 is safeguarded from coming into conflict with or interfering with the crank case section *b* in the course of its cutting stroke.

Figure 6:
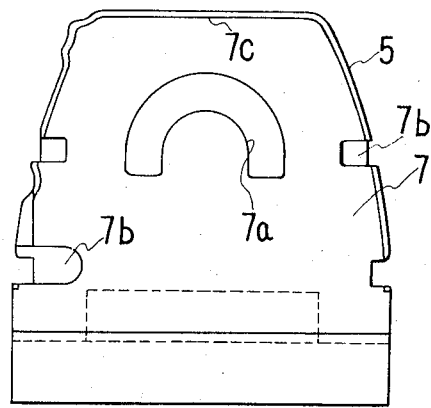
FIG. 6 is a front view of cutting edge employed in the present invention unit.
Figure 7:
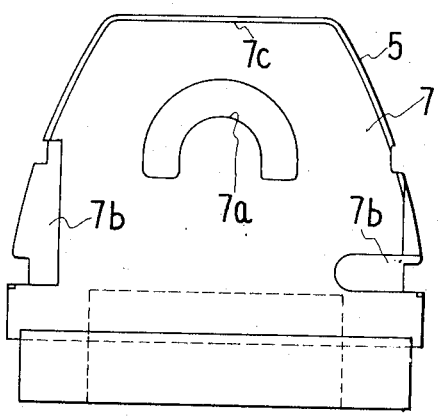
FIG. 7 is a front view of another cutting edge.

In FIGS. 6 and 7, such preventive measures are shown in detail. The blade 7 supporting the cutting edge 5 is formed with a cut-out portion 7*a* in a position to register with the metal retainer 3 and with a notch 7*b* in a position to interfere with the projected part on the internal wall of the crank case section *b*. In addition, the peripheral part of the blade 7 is reduced as at 7*c* and receded from the bore surface of the crank case section *b* so as to prevent any interference which might otherwise be caused when the cutting edge 5 is moved for shearing the burr.

Figure 8:
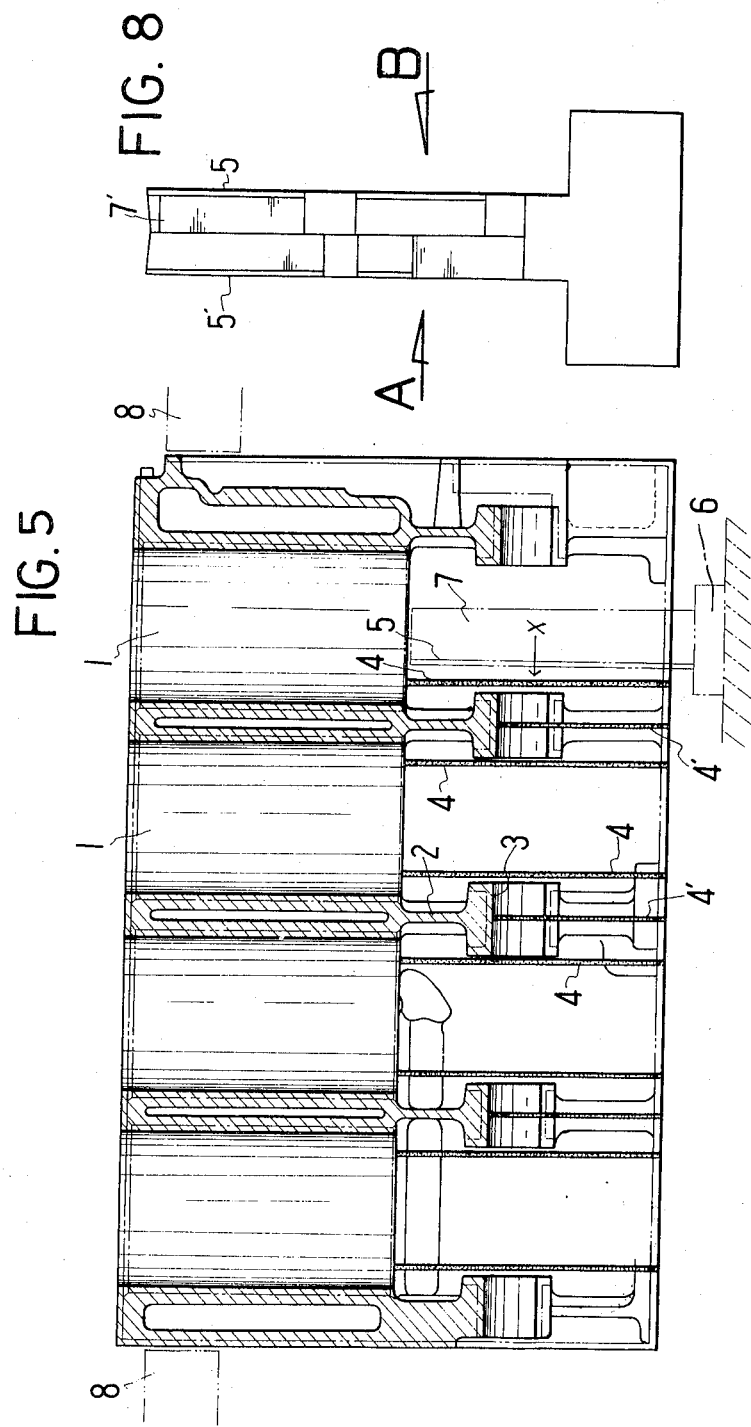
FIG. 8 is a side view of still another cutting edge.
Figure 9:
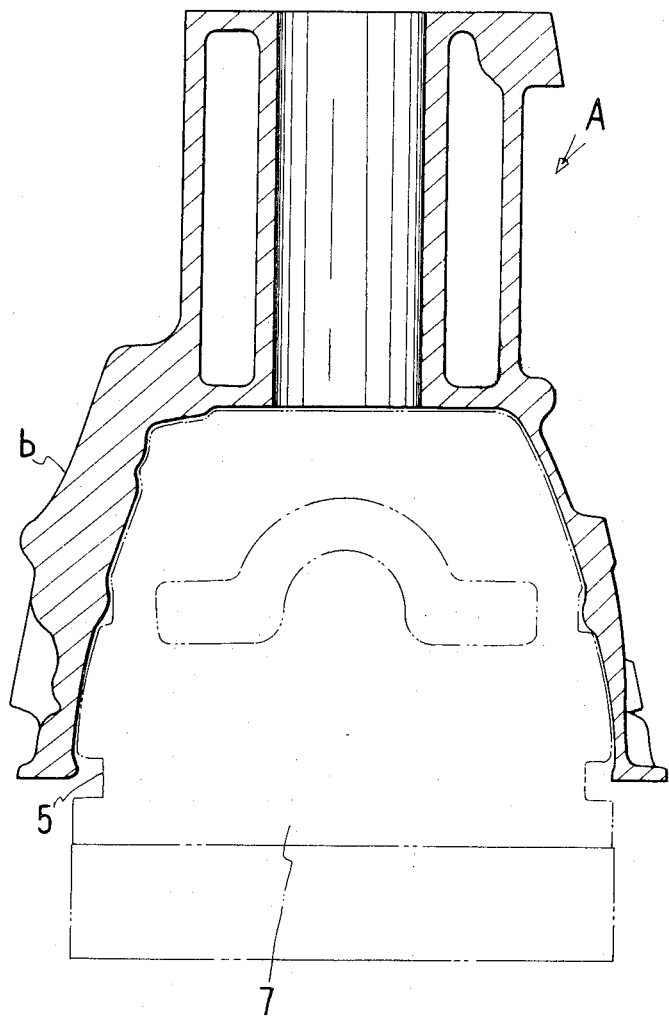
FIG. 9 is a explanatory view showing the operation of cutting edge shown in FIG. 8, which is viewed from the direction B of FIG. 8.
Figure 10:
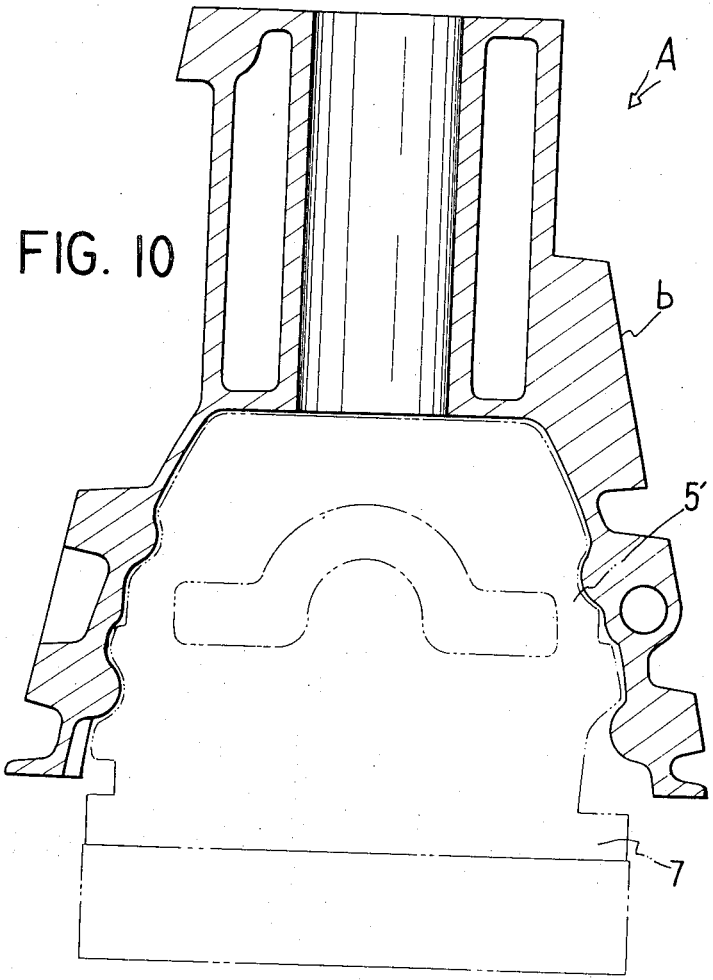
FIG. 10 is a view similar to FIG. 9 but viewed from the direction A in FIG. 8.

It is moreover unnecessary to support or mount each cutting edge 5 on its individual blade 7. As shown in FIG. 8, on the front and back surfaces of the blade 7' as viewed in its operating direction are inserted a cutting edge 5 with a contour as shown in FIG. 9 and a cutting edge 5'' with a contour as shown in FIG. 10 so that a single blade 7' will carry said two cutting edges 5, 5''.

The blade 7' thus formed is used with the cutting edge placed between partition walls 2, 2 in FIG. 3.

The arrangement described above has such an advantage that the same blade can be used for supporting two cutting edges 5 and the blade can be endowed with sufficient strength. As this blade is required to cut two burrs 4, 4 in different locations, the blade 7' is placed in an intermediate position between said burrs 4, 4. The blade 7' is then moved towards one burr 4 from said intermediate position for cutting it and then towards the other burr 4 beyond said intermediate position for cutting it and finally returned to said position.

Figure 11:
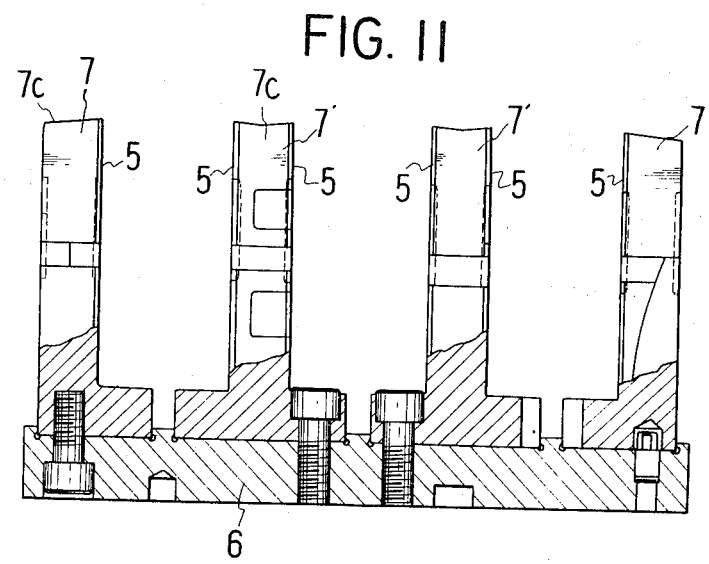
FIG. 11 is a front view of cutting edges mounted in alignment on a machine bed, which is partly cut open.
Figure 12:
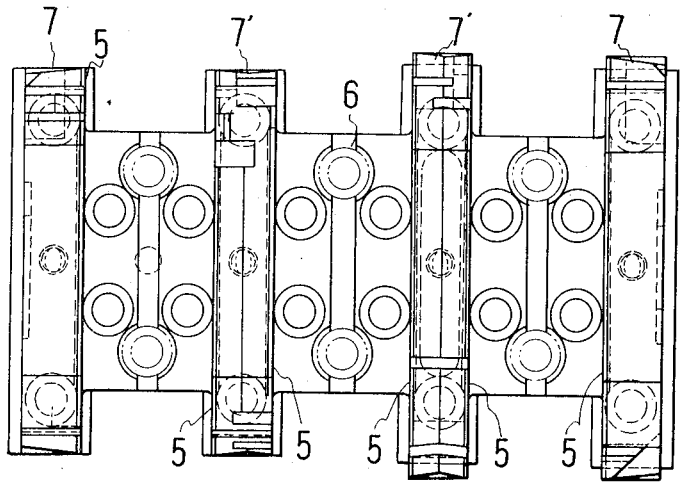
FIG. 12 is a plan view of FIG. 10.
Figure 13:
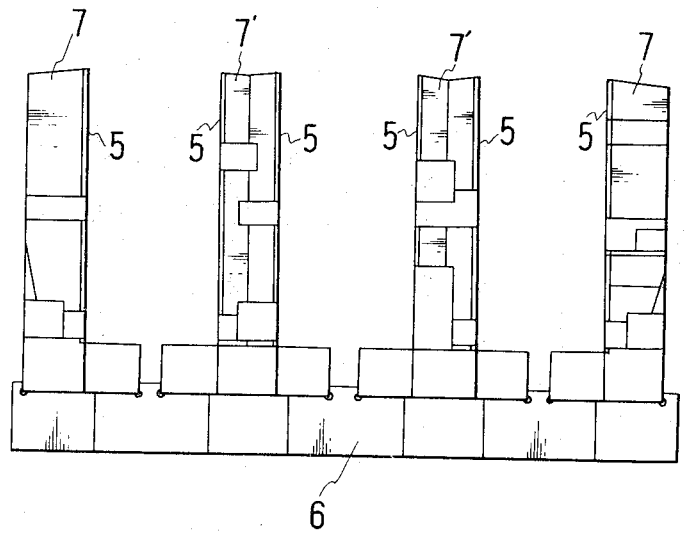
FIG. 13 is a front view of FIG. 10.

Each cutting edge 5 thus formed may be so designed and arranged that the burrs 4 formed on the internal surface of the crank case section *b* are cut by the separate operation of the cutting edges 5. However, since the shearing action occurs in the axial direction of the crank case bore and in the inside of the crank case section *b* and the burrs 4 formed on the different places are of about the same thickness, the same stroke can be used for shearing, the blade 7 carrying these cutting edges 5 can be mounted in parallel relation on the base 6 as shown in FIGS. 11 to 13. When the machine base 6 is moved, the respective cutting edges 5 can be moved simultaneously for cutting the respective burrs 4.

Figure 14:
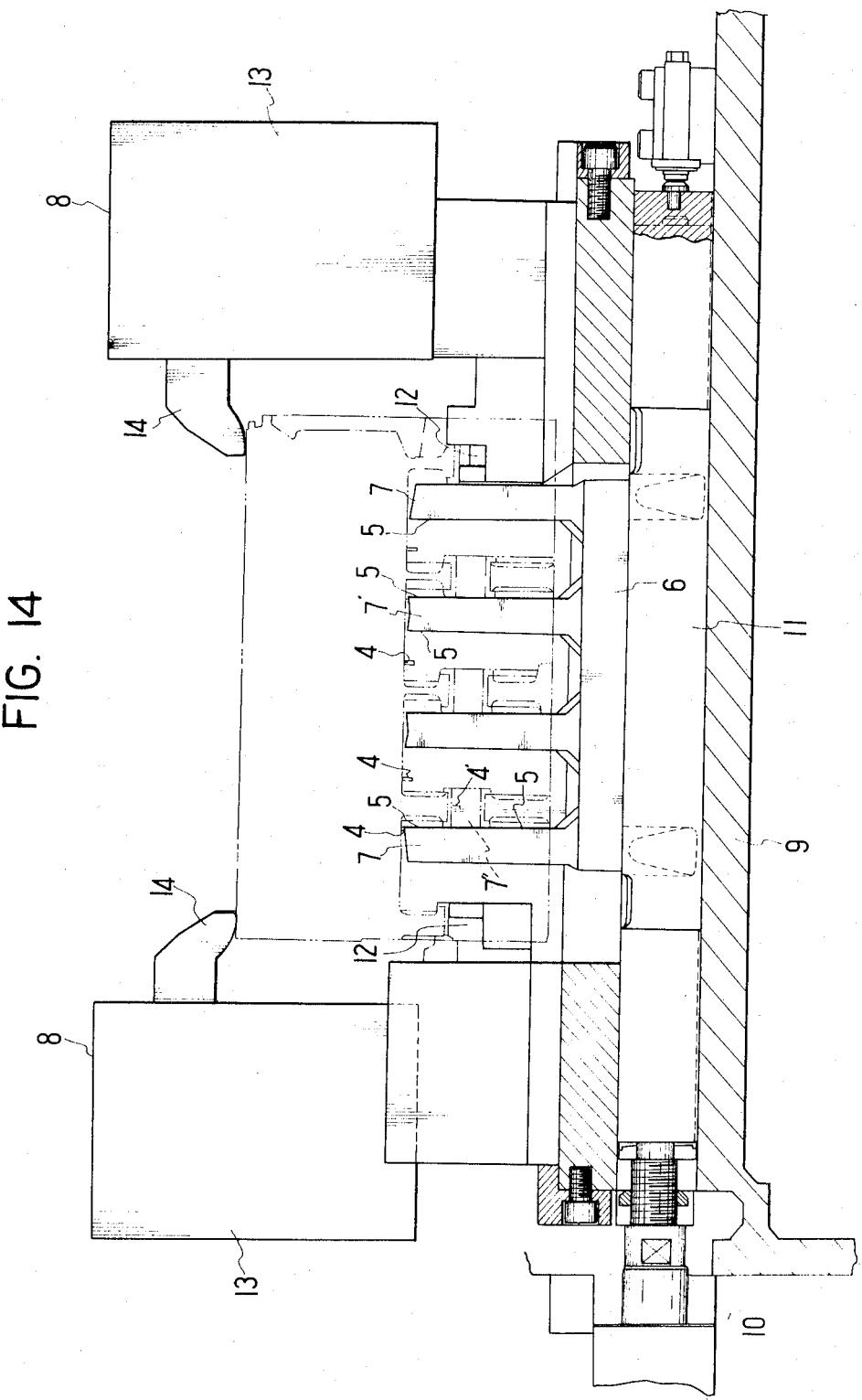
FIG. 14 is a longitudinal sectional view of the present invention unit of an embodiment.

FIG. 14 shows an example of the automatic deburring device constructed in the above-mentioned manner. The machine base 6 mounting the blades 7 each carrying cutting edges 5 in a parallel relation is secured to a base block 11 which slides in turn in a horizontal direction on a support 9 under operation of a hydraulic cylinder system 10. Around said machine base 6, there is mounted a carrier 12 for mounting a cylinder block A thereon, said carrier 12 being fixedly positioned with respect to said support 9. Above said carrier 12, there is provided a retainer device 8 equipped with an arm 14 which can be projected from and receded into a machine housing 13 by the action of any suitable drive means so as to abut on and secure said cylinder block A placed on said carrier 12. The arrangement is so made that when the cylinder block A is set in position and the base block 11 reciprocated under the action of the hydraulic cylinder system 10, the burrs 4 formed on the different places inside the bore of the crank case section of the cylinder block can be shorn off and removed concurrently.

It is to be understood that, when the cylinder block A is set in position by the retaining device 8, the respective cutting edges 5 should be mounted on the machine base 6 in such positions as to register with the burrs 4 to be cut. Since the blade 7' equipped on its front and rear faces with the said cutting edges 5, 5 is provided in the present device, the reciprocating motion of the machine base 6 for cutting operation is the same as the motion required of the blade 7' for cutting the burrs.

In the present device, the cutting edge 5 for deburring the bore of the crank case section b of the cylinder block A is supported upwards on the machine base 6, while the cylinder block A is maintained on the carrier 12 so that the crank case section b thereof is opened towards the lower side. This means that the burrs 4 formed on the internal wall of the crank case section b, when cut by the cutting edge 5 and severed from the internal wall of the crank case section b, will be discharged through the opening on the bore of said section b by their own gravity, thus facilitating the disposal of the removed burrs 4.

Figure 15:
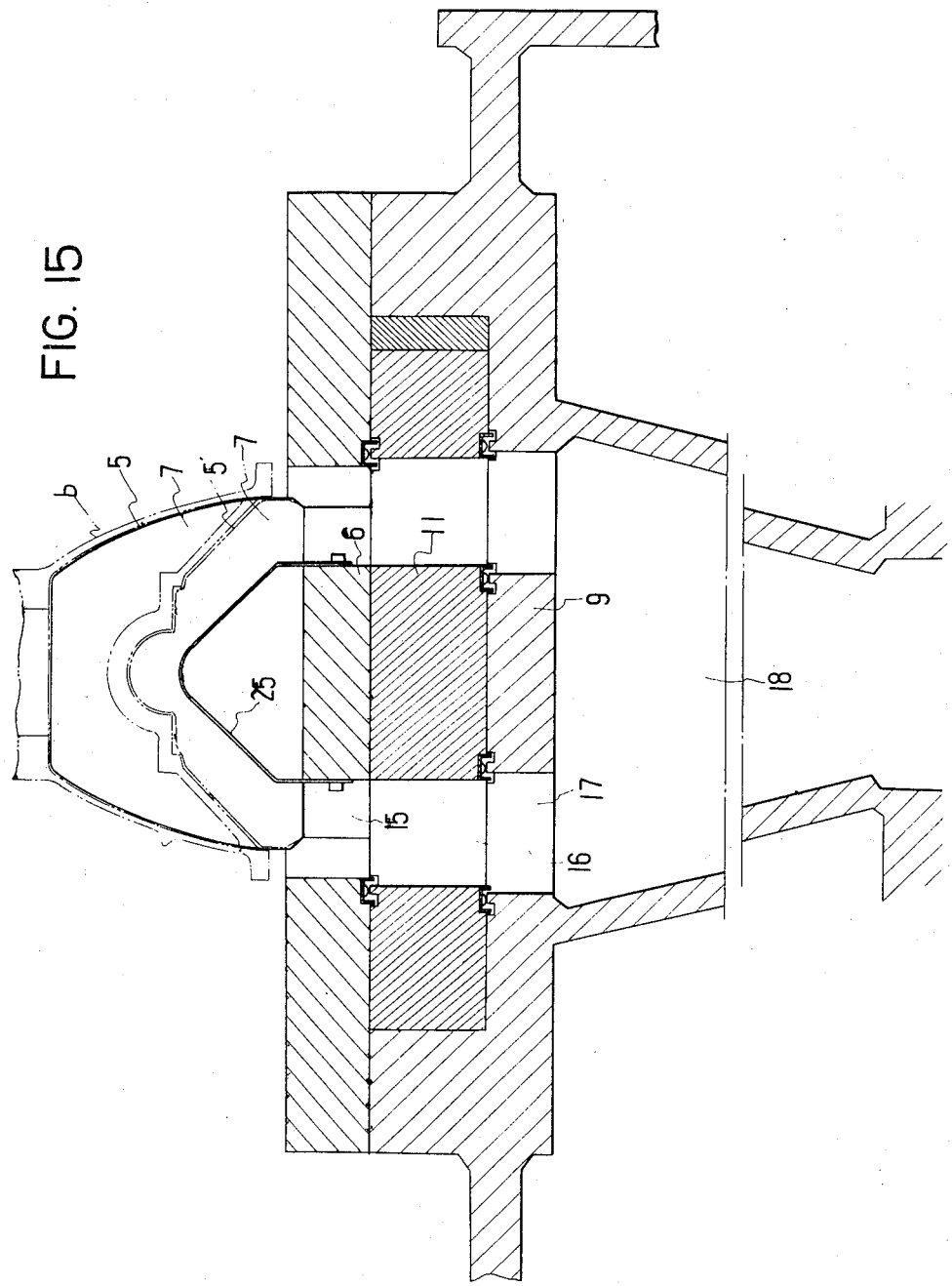
FIG. 15 is a vertical sectional view of the unit shown in FIG. 14, taken at middle portion thereof.
Figure 18:
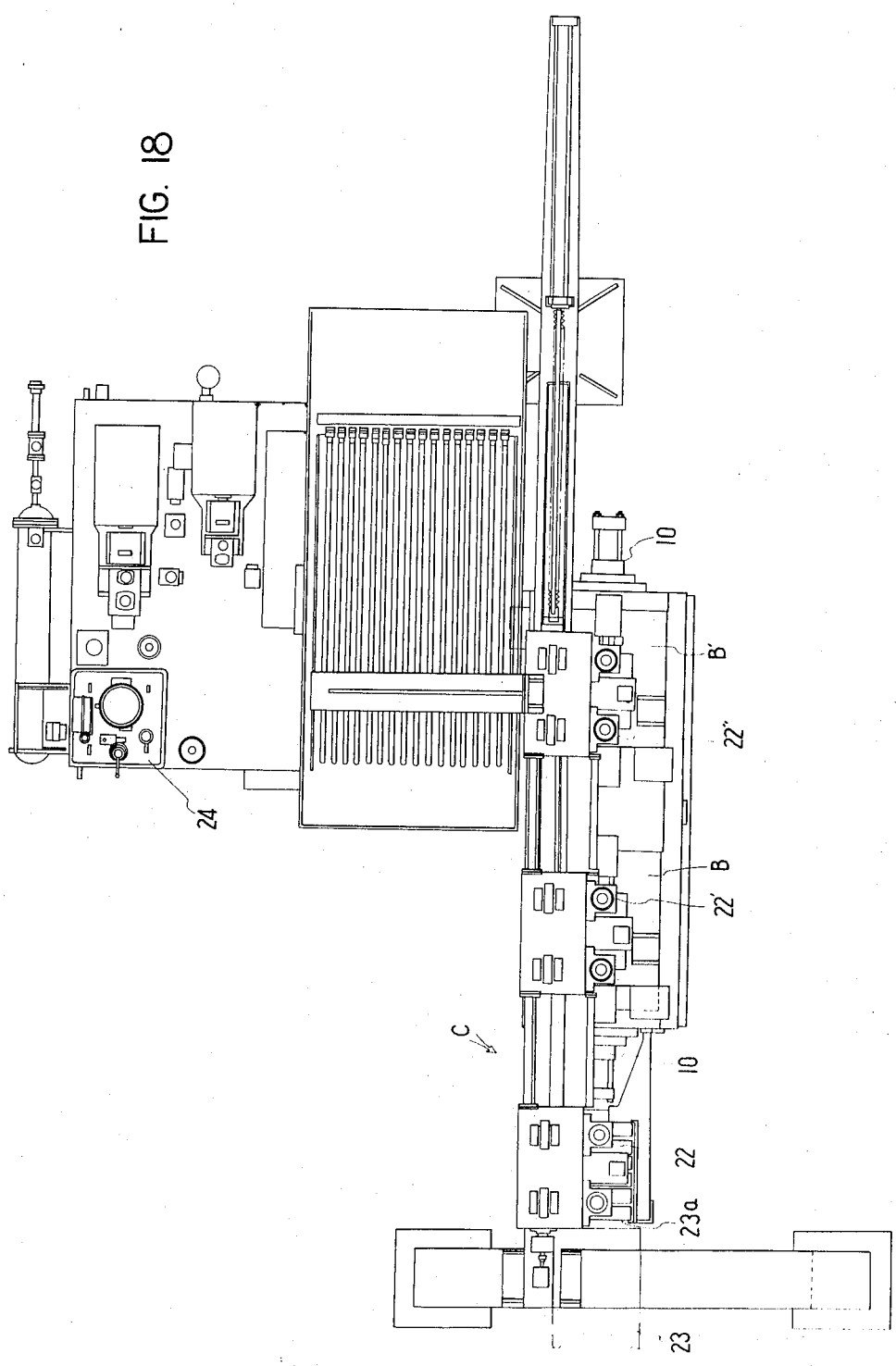
FIG. 18 is a plan view of FIG. 16.

Moreover, as shown in FIG. 15, the machine base 6 reciprocated with the support member 7 and the base block 11 as well as support 9 for supporting it are provided with drop openings 15, 16, 17 and a chute 18 for communicating the bore of the section b of the cylinder block A positioned on the carrier 12 with the space below the base block 11. In this way, the burrs 4 severed by the cutting edges 5 and dropped via the opening on the crank case section b to be accumulated around the support member 7 can be delivered downwards. This effect can be enhanced by proving a guide plate 25 on the machine base 6, as shown in FIG. 15, said guide plate 25 being adapted for guiding the burrs 4 severed by the cutting edges 5 towards the drop opening 15.

FIG. 16 shows, by way of an example, a fully automatic deburring device consisting of the combination of the above-mentioned automatic deburring device with loaders etc. so that the deburring of the cylinder block by the deburring device as well as the loading and unloading of the cylinder block to and from the deburring device can be performed fully automatically.

In the drawing, the automatic deburring device as above-mentioned is designated at B and B' and comprises a base block 11 movable transversely on the base 9 by the hydraulic cylinder unit 10, a machine base 6 supported on the base block 11 (not shown explicitly in the drawing), a blade 7 carring cutting edges 5 mounted in parallel relation on the base 6 (not shown explicitly in the drawing), a carrier 12 mounted adjacent to the blade 7 and a positioning unit 8 for positioning cylinder block A on the carrier 12. This device is arranged in two rows on the base 9.

The loader for loading and unloading cylinder block A on said device is shown at C and comprises three clamping units 22 which are carried by the bodies 20 movable transversely on the rail 19 positioned upwardly of said units B, B and which can be raised and lowered under the action of the hydraulic cylinder units 21. The first clamping unit 22 loads a cylinder block A on the first deburring device B, said cylinder block being transferred on a table 23a mounted adjacent to said unit B by means of the conveyor unit 23. The second unit 22' transfers the cylinder block A loaded on the first unit B to the second unit B'. The third unit 22'' takes out the block A from the second unit B' and places it on a suitable conveyor unit or on a table.

In the first deburring device B, the cutting edges 5 mounted in parallel on the machine base 6 are adapted for cutting the burrs 4 on either sides of the partition wall 2 within the crank case section b of the cylinder block A. On the other hand, the cutting edges mounted in parallel on the machine base 6 of the second unit B' are adapted for cutting burrs 4' formed on the center line of the bearing surface for the metal retainer 8 inside the crank case section b.

Figure 17:
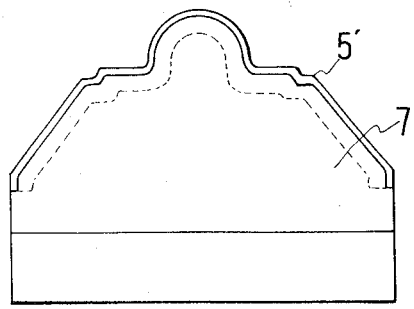
FIG. 17 is a front view of a cutting edge which is adapted to shear the burr produced about a metal retainer.

Since the cutting edges 5, 5' for shearing different kinds of burrs 4, 4' formed in the inside of the crank case section b are mounted separately on the separate units, the operation of the cutting edges 5' for shearing the burrs 4' produced along the center line of the bearing surface of the metal retainer 3 is made smooth. Said cutting edges 5' are in the form as shown in FIG. 17, and are of the size that can be contained within the contour line of the cutting edges 5 for cutting the burrs 4. Thus, the cutting edges 4' can be supported on the extension of the front surface of the blade 7 for the cutting edges 5. Such arrangement is shown by the dotted line in FIG. 14 wherein the cutting edges 5 are adapted exclusively for cutting the burrs 4 produced on either sides of the partition wall 2. In this case, when the cutting edges cut the burrs 4 on either sides of the wall 2, the cut burrs will be contained in the space between the cutting edges 5' and their blade on one hand and the bearing surface for the metal retainer 3 on the other, thus making the cutting operation ineffective. The satisfactory solution to this problem is provided by such arrangement that the two cutting edges are prepared separately and mounted on the different deburring units.

Secondly, according to the above-described embodiment, the cutting stroke for the burrs formed on either sides of the partition wall may be followed by the cutting stroke for the burrs 4' formed along the center line of the bearing surface for the metal retainer 3. In this way, the cut surface will be well-defined inasmuch as the blade 7'' for the cutting edges 5' for cutting burrs 4' can be moved by a larger distance.

The numeral 24 denotes a control unit for controlling the operation of the deburring units B, B', conveyor unit 23 and loader C. Any known device can be used as this control unit.

What is claimed is:

1. An automatic deburring process for the removal of burrs produced on the bore of the engine cylinder block comprising providing a semicircular blade having axially displaced respective cutting edges for cutting the semicircular burrs produced on the inner wall of the crank shaft section of the cylinder block of the automotive engine on both sides of the partition wall for carrying the metal retainer and along the center line of the bearing surface for said metal retainer, said cutting edges being so contoured as to coincide with the lines connecting the base of said burrs contiguous to the inner wall of said block;

placing said blade within the crank-shaft chamber; axially reciprocating the blade a short axial distance against said burrs in the inside of the bore of said section in the proximity of said burrs, thereby severing the burrs along their base portions contiguous to the inner wall of said section and displacing them.

2. An automatic deburring unit for the burrs produced inside the bore of the cylinder block of an automotive engine comprising cutting edges contoured to register with the base lines on the inner wall surface of the crank case section of the cylinder block, of the semicircular burrs produced on said inner wall surface, a blade member carrying said cutting edges within the bore of the section and in the proximity of the burrs they are adapted to cut, and means for reciprocating said blade member axially of the metal retainer provided in the crank case section by a stroke distance necessary for the cutting of the burrs by the cutting edges carried by said blade member.

3. An automatic deburring unit for the burrs produced inside the bore of the cylinder block of an automotive engine comprising cutting edges contoured to register with the base lines on the inner wall surface of the crank case section of the cylinder block, of the semicircular burrs produced on said inner wall surface, a blade member carrying said cutting edges inside the bore of said section and in the proximity of the burrs they are adapted to cut, and means for reciprocating said blade member axially of the metal retainer provided in the crank case section by a stroke distance necessary for the cutting of said burrs by the cutting edges carried by said blade member, characterized by that the blade member has an enhanced thickness in the direction of operation of said cutting edges, and is provided with means for preventing the possible interference with the inner wall surface of said section and the metal retainer.

4. An automatic deburring unit for the burrs produced within the bore of an automotive engine comprising cutting edges contoured to register with the base lines on the inner wall surface of the crank case section of the cylinder block, of the semicircular burrs produced on said inner wall surface, a blade member carrying said cutting edges within the bore of the section and in the proximity of the burrs they are adapted to cut, and means for reciprocating said blade member axially of the metal retainer provided in the crank case section by a stroke distance necessary for cutting the burrs by the cutting edges carried by said blade member, wherein two different cutting edges adapted for cutting the burrs produced in the different locations are provided on front and rear sides of the blade member for the cutting edges relative to the operating direction of the blade member.

5. An automatic deburring unit for the burrs produced within the bore of an automotive engine comprising cutting edges contoured to register with the base lines on the inner wall surface of the crank case section of the cylinder block, of the semicircular burrs produced on said inner wall surface, a plurality of blade members each carrying cutting edges within the bore of the section and in the proximity of the burrs they are adapted to cut, and means for reciprocating said blade members axially of the metal retainer provided in the crank case section by a stroke distance necessary for cutting the burrs by the cutting edges carred by each said blade member, characterized in that the blade members for the cutting edges adapted for cutting the burrs produced on the different locations are arranged and supported in parallel relation on the machine base for cutting the burrs by the reciprocating motion of the machine base.

6. An automatic deburring unit for the burrs produced inside the bore of the cylinder block of an automotive engine comprising cutting edges contoured to register with the base lines on the inner wall surface of the crank case section of the cylinder block, of the semicircular burrs produced on said wall surface, a blade member carrying said cutting edges within the bore of the section and in the proximity of the burrs they are adapted to cut, and means for reciprocating said blade member axially of the metal retainer provided in the crank case section by a stroke distance necessary for cutting the burrs by the cutting edges carried by said blade member, characterized by that the blade member carrying the cutting edges is mounted upright on the machine base reciprocated sideways by the reciprocating unit and the cylinder block is positioned so that the crank case section thereof is opened towards the underside for the deburring operation.

7. An automatic deburring unit for the burrs produced inside the bore of the cylinder block of an automotive engine comprising cutting edges contoured to register with the base lines on the inner wall surface of the crank case section of the cylinder block, of the semicircular burrs produced on said inner wall surface, a blade member carrying said cutting edges within the bore of the section and in the proximity of the burrs they are adapted to cut, and means for reciprocating said blade member axially of the metal retainer provided in the crank case section by a stroke distance necessary for cutting the burrs by the cutting edges carried by said blade member, characterized by that the blade member carrying the cutting edges is mounted upright on the machine base reciprocated sideways by the reciprocating means, and that a drop opening is provided on the machine base for removal of the severed burrs.

8. An automatic deburring unit for the burrs produced within the bore of the cylinder block of an automotive engine comprising cutting edges contoured to register with the base lines on the inner wall surface of the crank case section of the cylinder block, of the semicircular burrs produced on said wall surface, a blade member carrying said cutting edges within the bore of the section and in the proximity of the burrs they are adapted to cut, and means for reciprocating said blade member axially of the metal retainer provided in the crank case section by a stroke distance necessary for cutting the burrs by the cutting edges carried by said blade member, characterized by that only the cutting edges adapted for cutting the burrs produced on both sides of the partition wall inside the crank case section or the cutting edges adapted for cutting the burrs produced on the bearing surface of the metal retainer are mounted in parallel relation on the machine base reciprocated by the reciprocating unit.

9. An automatic deburring unit for the burrs produced within the bore of the cylinder block of an automotive engine comprising cutting edges contoured to register with the base lines on the inner wall surface of the crank case section of the cylinder block, of the semicircular burrs produced on said wall surface, a blade member carrying said cutting edges within the bore of the section and in the proximity of the burrs they are adapted to cut, and means for reciprocating said blade member axially of the metal retainer provided in the crank case section by a stroke distance necessary for cutting the burrs by the cutting edges carried by said blade member, characterized by that the automatic deburring unit is subdivided into a unit section provided with cutting edges for cutting the burrs located on both sides of a partition wall within the crank case section and a unit section provided with cutting edges for cutting the burrs produced on the bearing surface for the metal retainer, and said unit sections are located in juxtaposition in the order described and coordinated by a loader for cylinder blocks so that the stroke for cutting the burrs located on both sides of the partition wall is followed by the stroke for cutting the burrs produced on the bearing surface for the metal retainer.

* * * * *